United States Patent
Sussman

(10) Patent No.: US 10,780,389 B2
(45) Date of Patent: Sep. 22, 2020

(54) MAGNETIC DESICCANT BAG

(71) Applicant: DENSO International America, Inc., Southfield, MI (US)

(72) Inventor: Aaron Sussman, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 230 days.

(21) Appl. No.: 16/026,424

(22) Filed: Jul. 3, 2018

(65) Prior Publication Data

US 2020/0009501 A1   Jan. 9, 2020

(51) Int. Cl.
| | | |
|---|---|---|
| *B01D 53/26* | (2006.01) | |
| *B01D 53/28* | (2006.01) | |
| *F25B 43/04* | (2006.01) | |
| *F25B 43/00* | (2006.01) | |
| *B65D 75/12* | (2006.01) | |
| *F25B 39/04* | (2006.01) | |
| *B65D 75/44* | (2006.01) | |

(52) U.S. Cl.
CPC ............. *B01D 53/28* (2013.01); *B01D 53/26* (2013.01); *B65D 75/12* (2013.01); *F25B 39/04* (2013.01); *F25B 43/003* (2013.01); *F25B 43/043* (2013.01); *B01D 2257/80* (2013.01); *B65D 75/44* (2013.01); *F25B 2339/0441* (2013.01)

(58) Field of Classification Search
CPC ...... B01D 53/28; B01D 53/26; B01D 53/261; B01D 53/263; B01D 53/0415; B01D 2257/80; B65D 75/12; B65D 75/44; F25B 39/04; F25B 43/00; F25B 43/003; F25B 43/043; F25B 2339/0441

USPC .......................................................... 96/147
See application file for complete search history.

(56) References Cited

U.S. PATENT DOCUMENTS

| | | | | |
|---|---|---|---|---|
| 4,072,615 | A * | 2/1978 | McConnell ............ | B01D 15/00 210/282 |
| 5,308,665 | A * | 5/1994 | Sadek ................. | B01D 53/0407 206/204 |
| 5,934,773 | A * | 8/1999 | Ferrell ..................... | A24F 25/02 206/204 |
| 6,223,556 | B1 * | 5/2001 | De Keuster ............. | F25B 39/04 165/132 |
| 2004/0007012 | A1 * | 1/2004 | Lee .......................... | B23P 15/26 62/474 |
| 2008/0047702 | A1 * | 2/2008 | Neff ........................ | A24F 25/02 165/222 |
| 2009/0090244 | A1 * | 4/2009 | LeConey .............. | B01D 53/261 96/136 |
| 2012/0060546 | A1 * | 3/2012 | Armsden .............. | F25B 43/006 62/474 |
| 2016/0143344 | A1 * | 5/2016 | Lutgen .................. | A23L 3/3427 426/418 |

FOREIGN PATENT DOCUMENTS

CN   101913472 A   12/2010

\* cited by examiner

*Primary Examiner* — Frank M Lawrence, Jr.
(74) *Attorney, Agent, or Firm* — Harness, Dickey & Pierce, P.L.C.

(57) ABSTRACT

A modulator assembly may include a modulator tube, a magnetic end cap, a desiccant bag, and at least one magnet. The desiccant bag houses a plurality of desiccant beads and is disposed within the modulator tube. The at least one magnet is disposed in the desiccant bag and engages the magnetic end cap to position the desiccant bag against the end cap.

20 Claims, 3 Drawing Sheets

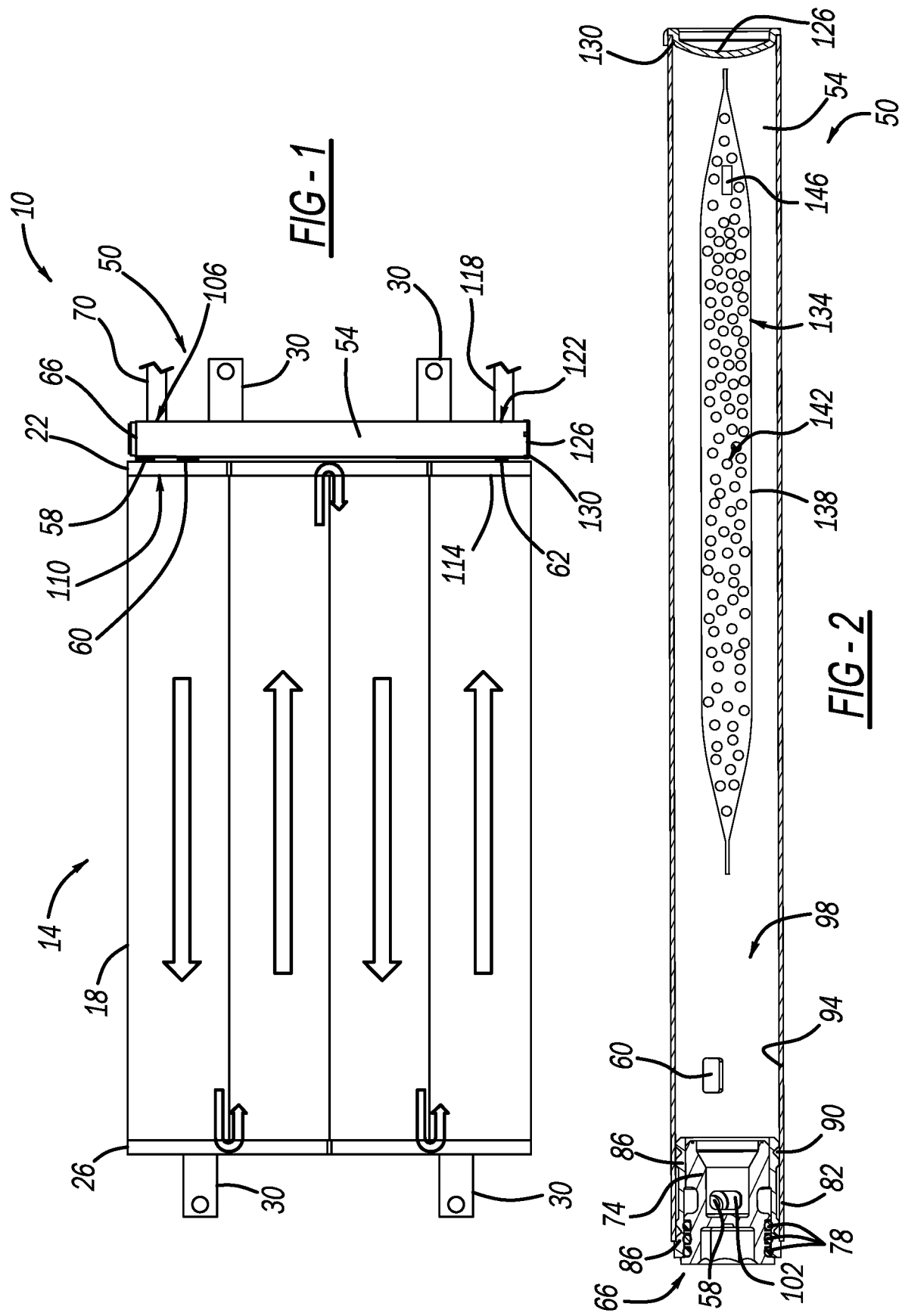

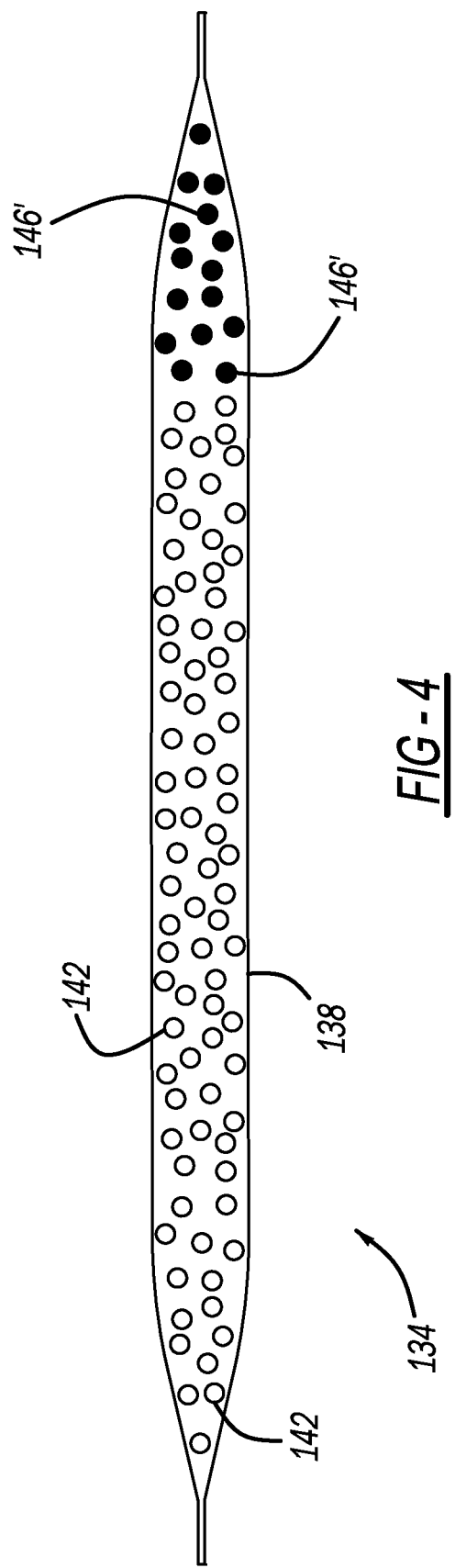

MAGNETIC DESICCANT BAG

FIELD

The present disclosure relates to a modulator assembly for a condenser, and specifically, to a magnetic desiccant bag for the modulator assembly.

BACKGROUND

This section provides background information related to the present disclosure which is not necessarily prior art.

Existing condensers include a modulator assembly that is often brazed to one of the header tanks. The modulator assembly may include a modulator tank. Refrigerant may flow through an inlet in the modulator assembly, through the condenser, and out the modulator assembly. Inside the modulator tank may be a desiccant bag that absorbs water contamination within the modulator tank.

As with any parts that are in constant contact, the modulator tank may rub the desiccant bag, forming a hole or rip in the bag. Additionally, the bag may obstruct the inlet and/or outlet holes of the modulator tank.

SUMMARY

This section provides a general summary of the disclosure, and is not a comprehensive disclosure of its full scope or all of its features.

An example modulator assembly according to the present disclosure may include a modulator tube, a magnetic end cap, a desiccant bag, and at least one magnet. The desiccant bag houses a plurality of desiccant beads and is disposed within the modulator tube. The at least one magnet is disposed in the desiccant bag and engages the magnetic end cap to position the desiccant bag against the end cap.

The at least one magnet of the modulator assembly may be a single magnet disposed within the desiccant bag.

The at least one magnet of the modulator assembly may be a plurality of magnets disposed within the desiccant bag.

The modulator assembly may further include an inlet assembly having a filter cap and at least one seal.

The magnetic end cap of the modulator assembly may be fixed to one end of the modulator tube and the inlet assembly may be disposed in an inlet aperture on an opposing end of the modulator tube.

The at least one magnet of the modulator assembly may engage the magnetic end cap to position the desiccant bag away from the inlet aperture of the modulator tube.

The desiccant bag of the modulator assembly may be formed of felt.

The desiccant bag of the modulator assembly may be formed of a porous material.

The desiccant bag of the modulator assembly may be configured to absorb water in the modulator tube.

An example desiccant bag for a modulator assembly according to the present disclosure may include a housing, a plurality of desiccant beads, and at least one magnet. The desiccant beads may be disposed within the housing.

The at least one magnet of the desiccant bag may be a single magnet disposed within the housing.

The at least one magnet of the desiccant bag may be a plurality of magnets disposed within the housing.

The plurality of magnets in the desiccant bag may be the same size and shape as the plurality of desiccant beads.

The at least one magnet for the desiccant bag may be configured to engage with a magnetic end cap on a modulator tube.

The housing of the desiccant bag may be formed of a porous material.

The housing of the desiccant bag may be formed of felt.

The at least one magnet of the desiccant bag may be formed of a ferromagnetic metal or a ceramic.

The desiccant beads of the desiccant bag may be formed of a silica gel.

The desiccant beads of the desiccant bag may be configured to absorb water in a modulator tube.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates an exemplary condenser and modulator having a desiccant bag in accordance with the present teachings.

FIG. 2 illustrates a cross-sectional view of a bottom of the modulator illustrated in FIG. 1.

FIG. 4 illustrates another embodiment of a desiccant bag according to the present teachings.

Corresponding reference numerals indicate corresponding parts throughout the several views of the drawings.

DETAILED DESCRIPTION

Figure 3:
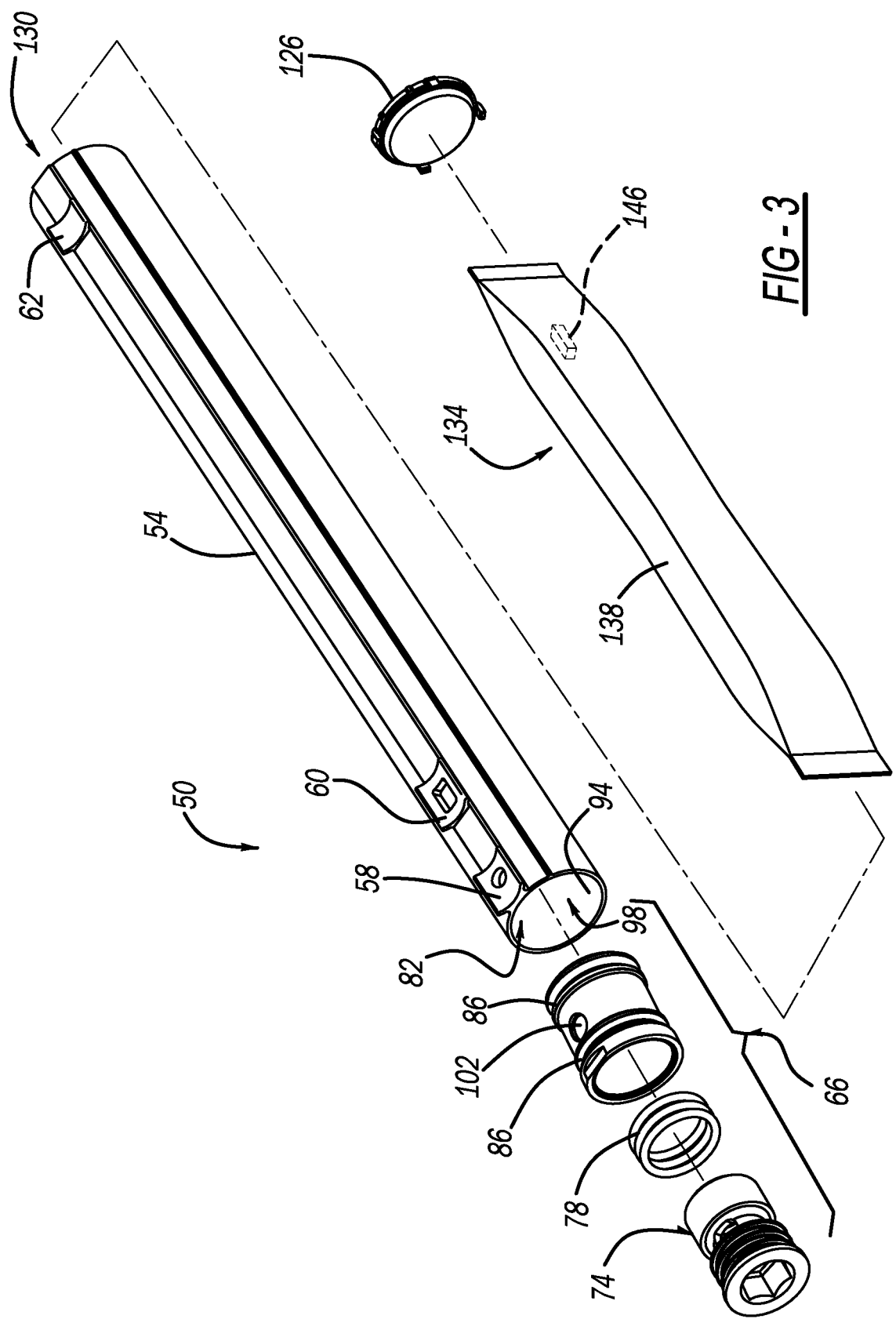
FIG. 3 illustrates an exploded view of the modulator illustrated in FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With initial reference to FIG. 1, a condenser assembly in accordance with the present disclosure is illustrated at reference numeral 10. The condenser assembly 10 can be configured for use with any suitable heating, ventilation, and air conditioning (HVAC) system, such as any suitable vehicle HVAC system or non-vehicular HVAC system. The condenser assembly 10 generally includes a condenser 14 and a modulator assembly 50.

The condenser 14 generally includes a core 18 of refrigerant conduits, which extend between a first header tank 22 and a second header tank 26. The condenser assembly 10 may include one or more mounting brackets 30 for mounting the condenser assembly 10 at any suitable location. In the example of FIG. 1, mounting brackets 30 are mounted to the modulator assembly 50 and the second header tank 26. The mounting brackets 30 may be secured in any suitable manner, such as by brazing.

Additionally referring to FIGS. 2-3, the modulator assembly 50 includes a tube 54. The tube 54 can be made of any suitable material, such as aluminum. The tube 54 is secured to the first header tank 22 by brazing at tank mating portions 58, 60, and 62.

The modulator assembly 50 includes an inlet assembly 66, which is connected to any suitable inlet conduit 70. The inlet assembly 66 may include a filter cap 74 having at least one seal 78. The filter cap 74 is inserted into an inlet aperture 82 on the tube 54. The inlet aperture 82 may be stamped in the tube 54. The filter cap 74 may include a threaded portion 86 that engages with a threaded portion 90 in the inlet aperture 82 to retain the filter cap 74 in the tube 54. The at least one seal 78 may cooperate with a wall 94 of the inlet aperture 82 to seal an inner space 98 of the tube 54. A bore 102 in the filter cap 74 may align with an inlet bore 106 in the wall 94 of the tube 54 to receive the inlet conduit 70.

Refrigerant flows through the inlet conduit 70 to the inlet assembly 66. From the inlet assembly 66, the refrigerant flows into the first header tank 22 through tank mating portion 58 and into the condenser 14 through a first opening 110 of the first header tank 22. At the condenser 14, high pressure gas refrigerant condenses as the refrigerant flows through the core 18. From the core 18, the refrigerant flows into a second opening 114 of the first header tank 22, and back to the modulator assembly 50 by way of the tank mating portion 60. Liquid refrigerant flows out of the modulator assembly 50 through an outlet conduit 118 and any remaining gaseous refrigerant continues to condense within the modulator assembly 50. The outlet conduit 118 may engage with an outlet bore 122 in the wall 94 of the tube 54 to receive the liquid refrigerant.

After the gaseous refrigerant condenses into liquid refrigerant, it flows out through the outlet conduit 118. Thus the condenser assembly 10 advantageously radiates heat out of the refrigerant and the HVAC system generally. The condenser assembly 10 can be configured as a three-pass condenser assembly, a one-pass condenser assembly, or any other suitable condenser assembly having any suitable number of passes, such as, but not limited to, passes of any odd number increments.

An end cap 126 may seal an outlet end 130 of the tube 54. The end cap 126 may be crimped on the wall 94 of the tube 54 and brazed during final assembly of the condenser assembly 10. The end cap 126 may be formed of a material having a magnetic property, such as an iron alloy. Other materials that may be used include nickel, cobalt, or any other brazable material having magnetic properties.

The modulator tube 54 may further house a desiccant bag 134 to absorb water contamination and humidity within the modulator tube 54. The desiccant bag 134 may include a porous bag, or sachet, 138 as a housing which contains a plurality of desiccant beads 142. The desiccant beads 142 may be, for example, a silica gel or other hygroscopic material, such as activated charcoal, calcium sulfate, calcium chloride, or molecular sieves. The porous bag 138 may be, for example, a felt bag, or a bag of any other porous material (such as a cloth) allowing the desiccant beads 142 to interact with the external environment.

Referring to FIGS. 2-4, at least one magnet 146 may be disposed within the bag 138. While a single magnet 146 is illustrated in FIGS. 2 and 3, a plurality of magnets 146' may also be used (See FIG. 4). The plurality of magnets 146' may be similar in size and shape to the desiccant beads 142. In either embodiment, the magnet 146, 146' may be any shape (such as spherical, cubical, etc.) and may be formed of any magnetic material. For example, the magnet 146, 146' may be formed of a ferromagnetic metal such as nickel, iron, or alloys thereof. The magnet 146, 146' may also include aluminum, cobalt, boron, rare earth elements, ceramics, etc.

During assembly, the at least one magnet 146, 146' is poured into the bag 138 prior to the desiccant beads 142. This allows the magnet(s) 146, 146' to freely move to the bottom of the bag 138.

In use, the magnet(s) 146, 146' are magnetically attracted to the end cap 126. Thus, the magnet(s) 146, 146' secure the bag 138 to the outlet end 130 of the tube 54, away from the inlet assembly 66. Securing the bag 138 away from the inlet assembly 66 provides several benefits to the modulator assembly 50. First, the arrangement prevents the bag 138 from ripping on any burrs in the inlet aperture 82 caused during the stamping process. Second, the bag 138 does not interfere with insertion of the filter cap 74 into the inlet aperture 82 on the tube 54. Finally, placing the magnet(s) 146, 146' in close proximity with the desiccant beads 142 improves the absorption properties of the desiccant beads 142.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modulator assembly comprising:
   a modulator tube;
   a magnetic end cap;
   a desiccant bag housing a plurality of desiccant beads and disposed within the modulator tube; and
   at least one magnet disposed in the desiccant bag and engaging the magnetic end cap to position the desiccant bag against the magnetic end cap.

2. The modulator assembly of claim 1, wherein the at least one magnet is a single magnet disposed within the desiccant bag.

3. The modulator assembly of claim 1, wherein the at least one magnet is a plurality of magnets disposed within the desiccant bag.

4. The modulator assembly of claim 1, wherein the magnetic end cap is formed of an iron alloy.

5. The modulator assembly of claim 1, further comprising an inlet assembly including a filter cap and at least one seal.

6. The modulator assembly of claim 5, wherein the magnetic end cap is fixed to one end of the modulator tube and the inlet assembly is disposed in an inlet aperture on an opposing end of the modulator tube.

7. The modulator assembly of claim 6, wherein the at least one magnet engages the magnetic end cap to position the desiccant bag away from the inlet aperture of the modulator tube.

8. The modulator assembly of claim 1, wherein the desiccant bag is formed of felt.

9. The modulator assembly of claim 1, wherein the desiccant bag is formed of a porous material.

10. The modulator assembly of claim 1, wherein the desiccant bag is configured to absorb water in the modulator tube.

11. A desiccant bag for a modulator assembly, the desiccant bag comprising:
    a housing;
    a plurality of desiccant beads disposed within the housing; and
    at least one magnet disposed within the housing.

12. The desiccant bag of claim 11, wherein the at least one magnet is a single magnet disposed within the housing.

13. The desiccant bag of claim 11, wherein the at least one magnet is a plurality of magnets disposed within the housing.

14. The desiccant bag of claim 13, wherein the plurality of magnets are the same size and shape as the plurality of desiccant beads.

15. The desiccant bag of claim 11, wherein the at least one magnet is configured to engage with a magnetic end cap on a modulator tube.

16. The desiccant bag of claim 11, wherein the housing is formed of a porous material.

17. The desiccant bag of claim 11, wherein the housing is formed of felt.

18. The desiccant bag of claim 11, wherein the at least one magnet is formed of a ferromagnetic metal or a ceramic.

19. The desiccant bag of claim 11, wherein the desiccant beads are formed of a silica gel.

20. The desiccant bag of claim 11, wherein the desiccant beads are configured to absorb water in a modulator tube.

* * * * *